US008623489B2

(12) United States Patent
Depaoli et al.

(10) Patent No.: US 8,623,489 B2
(45) Date of Patent: Jan. 7, 2014

(54) ANTISKID DUNNAGE

(75) Inventors: Diego Depaoli, Woodbridge (CA); Martin Parenteau, Drummondville (CA); Michael Kumar, Ajax (CA); Patrick Laroche, Toronto (CA); Hugues Prud'Homme, Saint-Thomas (CA); Ernie Carnegie, Etobicoke (CA)

(73) Assignee: Cascades Canada Inc., Kingsley Falls (CA)

( * ) Notice: Subject to any disclaimer, the term of this patent is extended or adjusted under 35 U.S.C. 154(b) by 1073 days.

(21) Appl. No.: 12/551,197

(22) Filed: Aug. 31, 2009

(65) Prior Publication Data
US 2010/0247849 A1 Sep. 30, 2010

Related U.S. Application Data

(60) Provisional application No. 61/163,943, filed on Mar. 27, 2009.

(51) Int. Cl.
*B32B 3/12* (2006.01)
*B63B 25/24* (2006.01)

(52) U.S. Cl.
USPC ............ 428/116; 428/34.2; 428/59; 428/118; 410/154; 410/155; 108/51.3; 229/87.01; 206/523; 206/586

(58) Field of Classification Search
USPC ............ 428/116–118; 83/861–887; 206/523, 206/586; 52/783.1, 793.1; 410/154; 108/51.3; 229/87.01
See application file for complete search history.

(56) References Cited

U.S. PATENT DOCUMENTS

| 2,950,038 | A | | 8/1960 | Rupp |
| 3,511,464 | A | | 5/1970 | Doll |
| 3,580,469 | A | | 5/1971 | Reese et al. |
| 3,684,636 | A | | 8/1972 | Rothrock, Jr. et al. |
| 3,725,188 | A | | 4/1973 | Kalt |
| 4,382,106 | A | * | 5/1983 | Royster ........................ 428/40.1 |
| 4,771,893 | A | | 9/1988 | Liebel |
| 4,883,179 | A | * | 11/1989 | Dionne ......................... 206/523 |
| 4,927,023 | A | | 5/1990 | Elzey |
| 5,040,696 | A | * | 8/1991 | Liebel ....................... 229/122.32 |
| 5,175,041 | A | | 12/1992 | Webb et al. |
| 5,230,701 | A | * | 7/1993 | Meyer et al. .................... 602/76 |
| 5,466,211 | A | | 11/1995 | Komarek et al. |

(Continued)

FOREIGN PATENT DOCUMENTS

JP 3133772 6/1991
WO 9828205 7/1998

*Primary Examiner* — Callie Shosho
*Assistant Examiner* — Nicholas W Jordan
(74) *Attorney, Agent, or Firm* — Norris McLaughlin & Marcus P.A.

(57) ABSTRACT

The dunnage can be used for protecting edges of articles such as wood furniture during shipping and has a honeycomb panel having a first and second opposed faces, and a first and second adjacent panel sections folded relative to each other along a V-groove extending into the first face, a layer of antiskid cohesive material applied on the V-groove and maintaining said first and second adjacent panels in said folded configuration, and also applied on a substantial portion of one of said first and second adjacent panel sections, on the first face. The cohesive on the exposed face of the folded dunnage acts as an antiskid which reduces the likelihood of the dunnage sliding once applied to the edge of the article, and also reduces the abrasiveness of the honeycomb panel. A process of production is also disclosed where the V-groove can be made on line.

14 Claims, 7 Drawing Sheets

(56) References Cited

U.S. PATENT DOCUMENTS

| | | |
|---|---|---|
| 5,511,667 A | 4/1996 | Carder |
| 5,533,956 A | 7/1996 | Komarek et al. |
| 5,680,934 A | 10/1997 | Jaegers et al. |
| 5,683,781 A * | 11/1997 | Komarek et al. ............ 428/116 |
| 5,711,426 A | 1/1998 | Kuhn et al. |
| 5,913,766 A | 6/1999 | Reed et al. |
| 5,950,835 A | 9/1999 | Moser et al. |
| 6,007,469 A | 12/1999 | Jaegers et al. |
| 6,007,470 A | 12/1999 | Komarek et al. |
| 6,372,322 B1 | 4/2002 | Devaguptapu |
| 7,111,734 B2 | 9/2006 | Robinson, Jr. |
| 7,299,924 B2 | 11/2007 | Robinson, Jr. |
| 7,309,665 B2 * | 12/2007 | Qureshi et al. ................ 442/136 |
| 2002/0025404 A1 * | 2/2002 | Taber et al. ................... 428/118 |
| 2006/0025511 A1 * | 2/2006 | Silvers et al. ................. 524/445 |

* cited by examiner

FIG_2

FIG_4

FIG_6

ANTISKID DUNNAGE

FIELD

The specification relates to a dunnage in the form of a folded honeycomb panel which can be used for protecting edges and/or corners of articles such as wood furniture during shipping.

BACKGROUND

Dunnage in the form of honeycomb panels folded along a V-groove are known per se. However, there remained room for improvement, in particular, folded honeycomb panels were known to slide on the faces of the articles to which they were applied during handling or shipping, which was unpractical. Also, former folded honeycomb panel dunnages were known to slightly scratch articles in some cases, which was undesired.

SUMMARY

The dunnage disclosed herein has a layer of an antiskid cohesive applied to exposed surfaces of the V-groove and to at least one of the adjacent sections bordering the V-groove. The antiskid cohesive is normally not activated and is not adhesive by itself but is activated automatically upon folding the blank when both sides of the V-groove are placed into contact with one another. The blanks can thus be conveniently shipped and handled in the unfolded state without particular wrapping or adhesive-covering requirements. Then, once folded, the portion of the antiskid cohesive layer which is on the section of the dunnage adjacent the groove can be applied onto the article, and without adhering thereto, it can provide beneficial antiskid properties resulting from the characteristics of the cohesive and help maintain it in place during handling and shipping of the article. The cohesive can also be less abrasive than the bare surface of the panels and thereby help protect the article from minor scratches. A polyisoprene-based cohesive, which can be obtained from a natural latex for example, can be particularly well suited for these purposes.

In accordance with one aspect there is provided an antiskid dunnage comprising: a honeycomb panel having a first and second opposed faces, and a first and second adjacent panel sections folded relative to each other along a V-groove extending into the first face, a layer of antiskid cohesive material applied on the V-groove and maintaining said first and second adjacent panels in said folded configuration, and also applied on a substantial portion of one of said first and second adjacent panel sections, on the first face.

In accordance with another aspect there is provided a blank for folding into an antiskid dunnage, the blank comprising: a honeycomb panel having a first and second opposed faces, and having a V-groove in the first face between two adjacent panel sections; a layer of antiskid cohesive including a first portion applied on the V-groove and a second portion applied on at least one of the two adjacent panels, on the first face thereof; wherein the blank can be folded along the V-groove into the dunnage configuration, and thence be automatically maintained in the dunnage configuration by activation of the first portion of antiskid cohesive with the second portion of antiskid cohesive being exposed to a work surface and providing antiskid thereagainst.

In accordance with another aspect there is provided a method of making an antiskid corner dunnage comprising: longitudinally conveying a web having a honeycomb panel with a first face at least partially coated with an antiskid cohesive, and while the web is so being conveyed cutting a longitudinal slit into the first face of the honeycomb panel using a slitter blade and forming a longitudinal V-groove into the longitudinal slit using an anti-adhesive portion of a V-groove blade.

For further clarity, in this specification, the expression "cohesive" is intended to relate to a type of adhesive which is normally not gummy nor adhesive to the touch, but which is activated when two covered surfaces are placed into contact with one another. In other words, a cohesive is a type of adhesive which adheres and bonds with itself, but does not normally adhere to other materials. The expression antiskid is used to refer to achieving a friction coefficient which is higher than without the cohesive.

DETAILED DESCRIPTION

Figure 1:
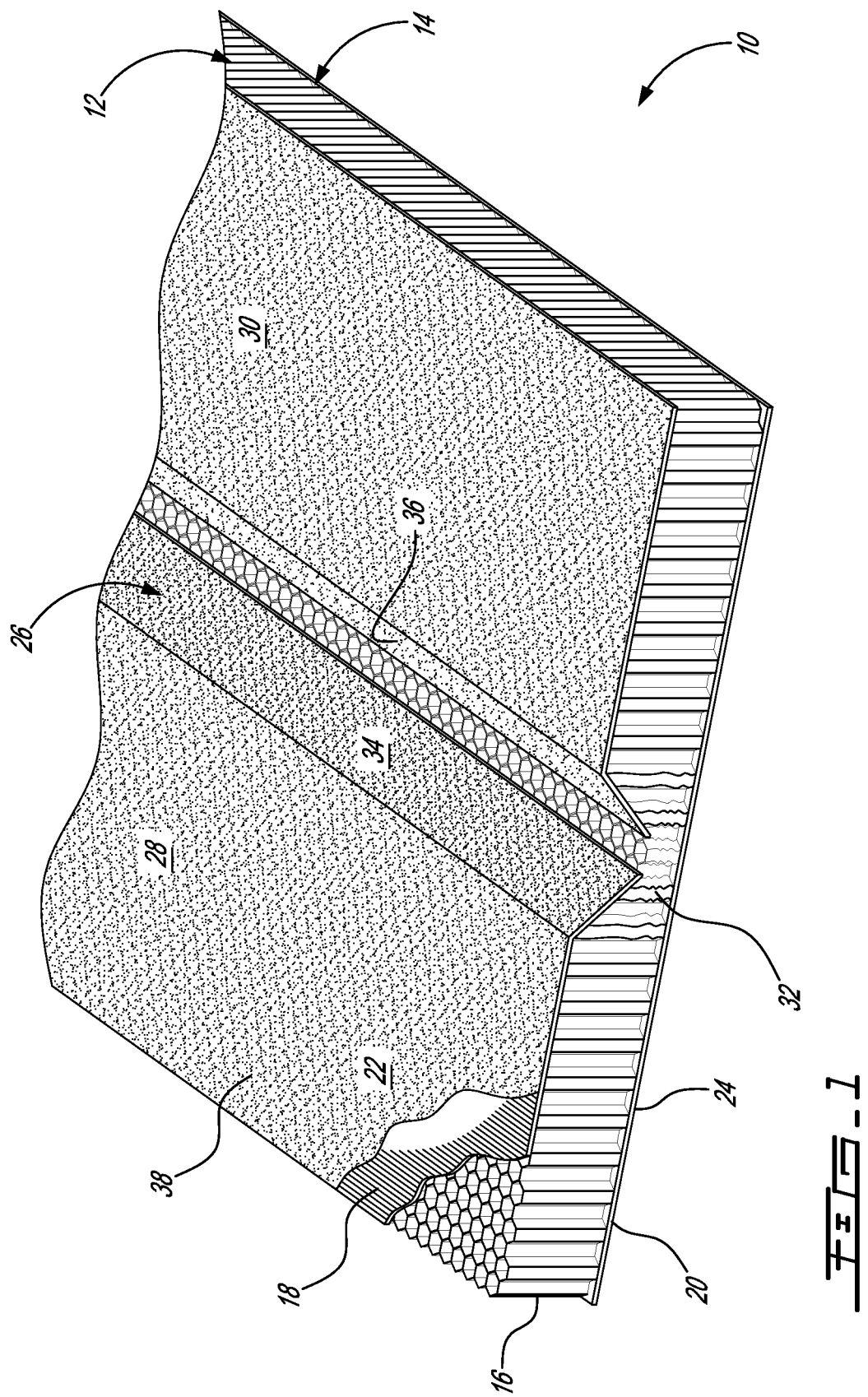
FIG. 1 is a perspective view, partly fragmented, of first embodiment of an antiskid dunnage.
Figure 2:
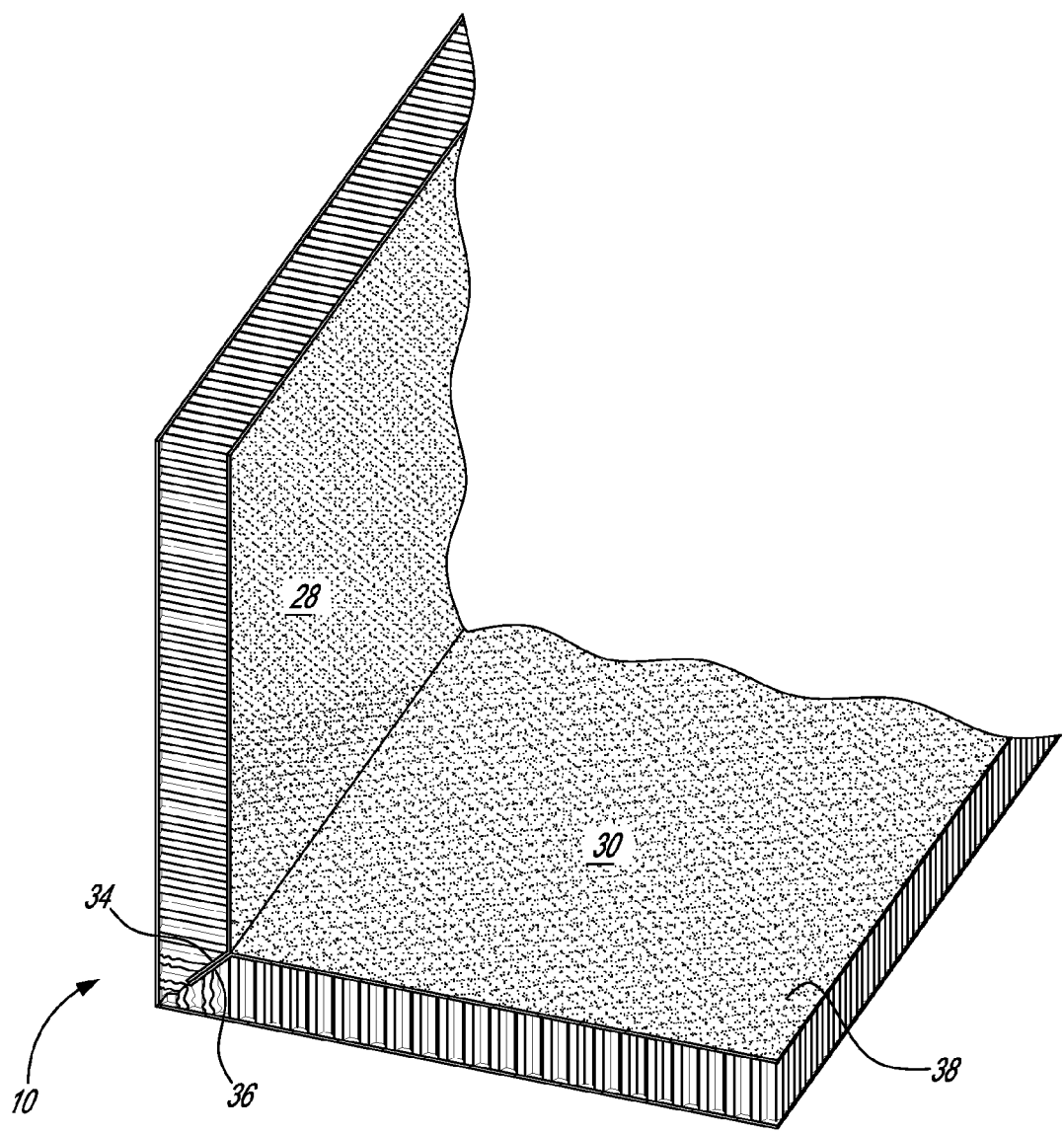
FIG. 2 is a perspective view of the antiskid dunnage of FIG. 1 once folded.

FIG. 1 shows an example of an antiskid dunnage 10, or more specifically, a blank 12 for folding into the antiskid dunnage 10 (shown in FIG. 2). The blank 12 has a honeycomb panel 14 which generally includes a honeycomb core 16 sandwiched between a first face sheet 18 and a second face sheet 20. The honeycomb panel 14 can thus be said to have a first face 22 and a second face 24. A V-groove 26 is defined in the first face 22 of the honeycomb panel 14, between two adjacent panel sections 28, 30. In this example, the V-groove 26 is formed by partially compressing the honeycomb core 16 as will be detailed further below, and a resulting compressed honeycomb section 32 is thus present below the edges 34, 36 of the first face sheet 18 which are folded into the V-shape.

In this embodiment, the entire first face 22 of the honeycomb panel 14 (i.e. the exposed face of the first face sheet 18) is covered with an antiskid cohesive 38. In this embodiment, the particular antiskid cohesive which is used is product name XB-808, manufactured by Bond Tech Industries inc. This cohesive is a polyisoprene based cohesive, and more particularly has a natural latex polyisoprene base. The characteristics of the polyisoprene-based cohesive in this case contribute to providing antiskid characteristics to the first face 22, on both panel sections 28, 30. In this example, a concentration of about 20 g/m$^2$ of cohesive 38 is applied to the first face 22. However, it will be understood that lesser concentrations can be used as well to reduce the amount of cohesive used and thereby reduce costs. For instance, as little as 2 g/m$^2$ of cohesive could be satisfactory on a face sheet having a closed surface, such as coated paper for example.

For illustrative purposes, in this case, the first face sheet 18 is a sheet of Kraft paper and the honeycomb core 16 is paper based. In alternate embodiments, any suitable face sheets can be used, such as Kraft liner, recycled liner, medium paper, chipboard, to name a few examples. A combination of layers can also be used. The cohesive 38 which is used is normally in an un-activated state, and does not adhere to materials which are placed into contact against it. The blank 12 is thus convenient to manipulate.

However, the cohesive 38 is activated by being applied against itself, which occurs inside the V-groove 26 when the blank 12 is folded into the dunnage configuration shown in FIG. 2. This activates the cohesive on surfaces 34 and 36 (FIG. 1) and thereafter maintains the antiskid dunnage 10 into the folded configuration. It will be noted here that the antiskid dunnage shown in FIG. 2 can be used for protecting edges of articles such as pieces of furniture and for securing the articles inside boxes during shipping, for example. It can be particularly useful in shipping furniture having square edges, such as wood or metal furniture. When the cohesive-covered surface of the panels 28 and 30 are applied to the article, the cohesive provides a higher friction coefficient and thus helps in maintaining the dunnage into position on the article. Using a cohesive 38 can provide a higher friction coefficient while simultaneously providing a softer (i.e. less abrasive) surface than bare Kraft paper which can reduce the likelihood of minor scratches being caused by the dunnage.

Figure 6:
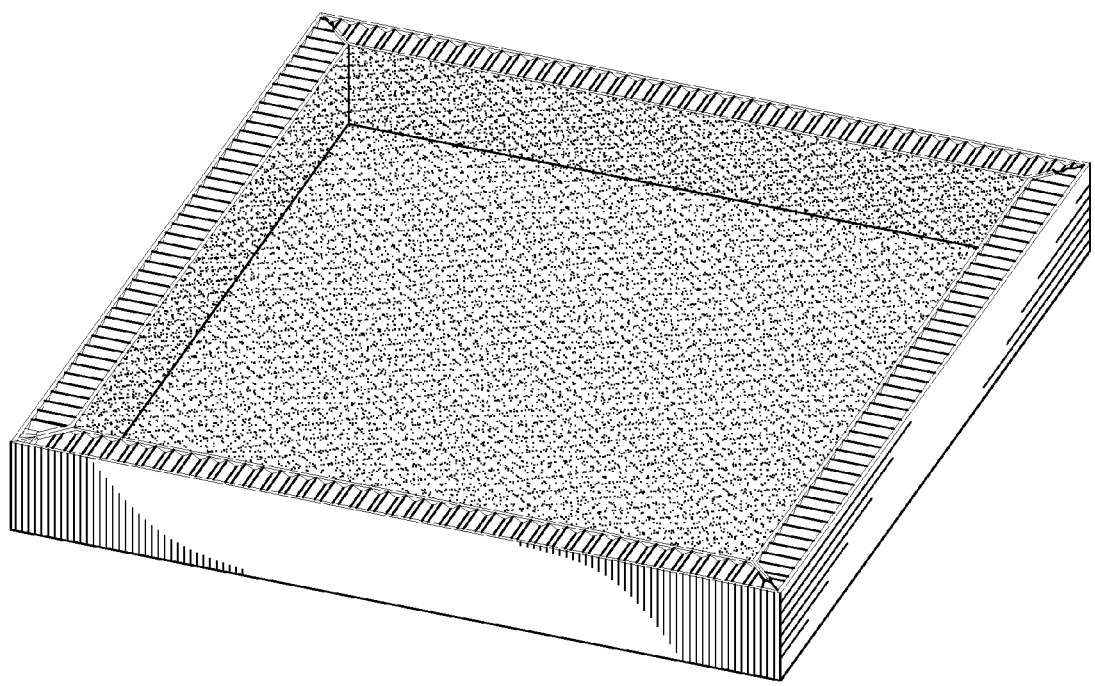
FIG. 6 is a picture showing an example of a 5-panel dunnage.

Other shapes of antiskid dunnage can be made as well which can include more than one V-groove, such as, for example, a three-panel configuration can be made with intersecting longitudinal and transversal V-grooves to adapt against a corner of a piece of furniture, or a five-panel configuration with two longitudinal V-grooves and two transversal V-grooves, such as shown in FIG. 6, can be made and used to entirely cover and surround a rectangular upper surface of an article, for example.

Figure 3:
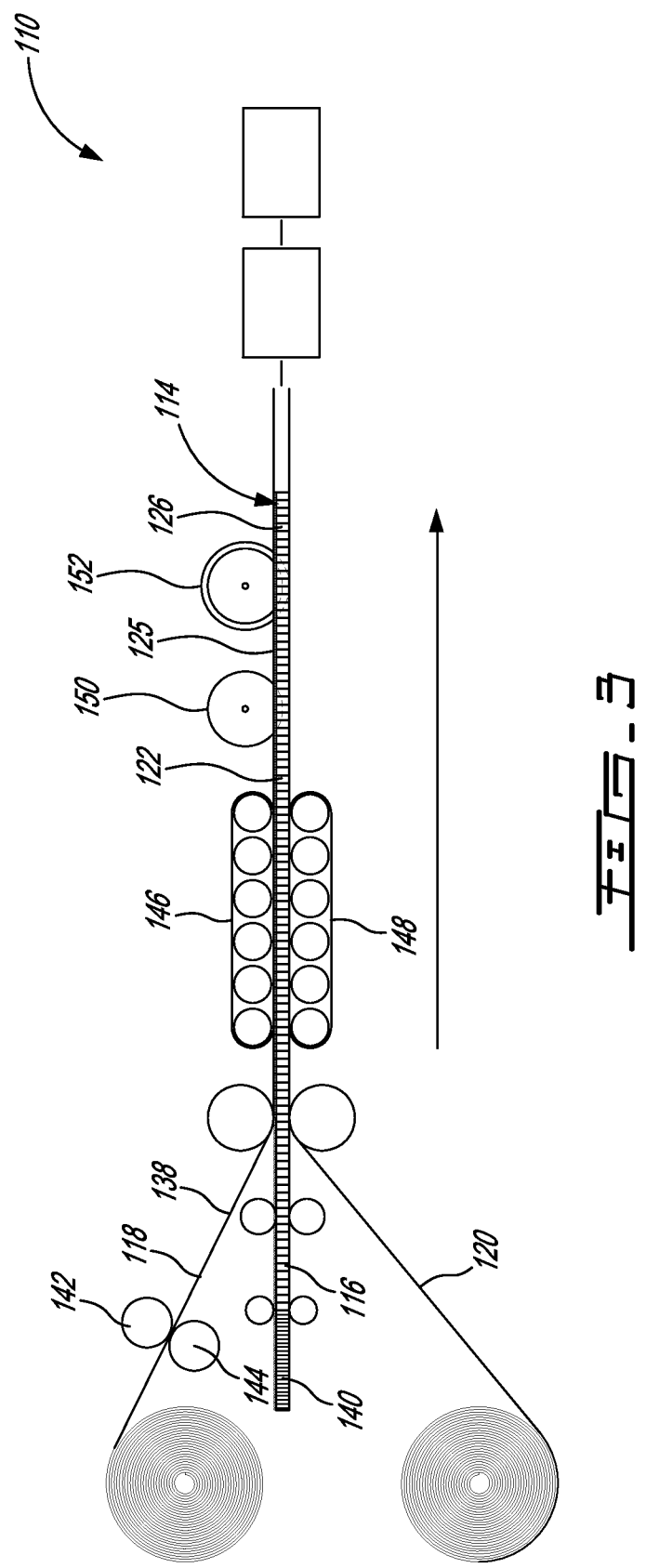
FIG. 3 is a schematic side elevation view of a method of making an antiskid dunnage.

FIG. 3 schematically shows a system 110 which can be used to make an antiskid dunnage such as shown in FIGS. 1 and 2. In this embodiment, the V-groove 126 is made directly on-line in the process of making the honeycomb panel 114, but it will be understood that in alternate embodiments, the V-groove can be made separately onto pre-made honeycomb panels, although, this will likely yield a lower production rate and thereby increase costs.

In the process of making the honeycomb panel 114, a honeycomb core 116 is expanded from a compressed state 140 while face sheets 118, 120 are applied onto the two opposed faces of the expanded honeycomb core 116. The face sheets 118, 120 can be any suitable sheets such as Kraft paper or even a combination of layers such as a corrugated cardboard for example, such as depicted in FIG. 3, and more than one face sheet can alternately be applied onto any one of the two faces of the honeycomb core. Typically, in the field of dunnage, the honeycomb core 116 is made of wood-fibre based materials, but other materials can be used as well if so desired. The cohesive can be pre-applied on a face of one of the face sheets, but applying it on-line as shown in FIG. 3, where it is applied with cohesive applying rollers 142, 144, can be preferred. If applied on-line, the cohesive 138 can be applied prior to adhering the face sheet to the honeycomb core as shown in FIG. 3, but can also alternately be applied after the face sheet has been adhered to the honeycomb core or as a subsequent process.

After the face sheets 118, 120 are applied and adhered to the expanded honeycomb core 116, conveyor belts 146, 148 maintain pressure in order for the adhesive to set. A thin circular slitter blade 150 can then be used to cut a longitudinal slit 125 into the first face 122 of the honeycomb panel 114, which is covered with the cohesive 138. An also circular but broader V-groove blade 152 having a V-shaped circular edge can then be used to compress the honeycomb core and fold edge portions (see 34, 36 in FIG. 1) of the face sheet 118 into the V-shape.

Experiments have shown that when doing the cutting and the V-groove on-line on a surface which is covered with cohesive 138, events of gumming can occur on the V-groove blade 152, and it can thus be helpful to use a V-groove blade which has at least a non-adhesive periphery. Using a V-groove blade made of Teflon, for example, can be useful. Alternately, the periphery of the blade can be made non-adhesive by covering it with an anti-adhesive coating, for example.

Figure 4:
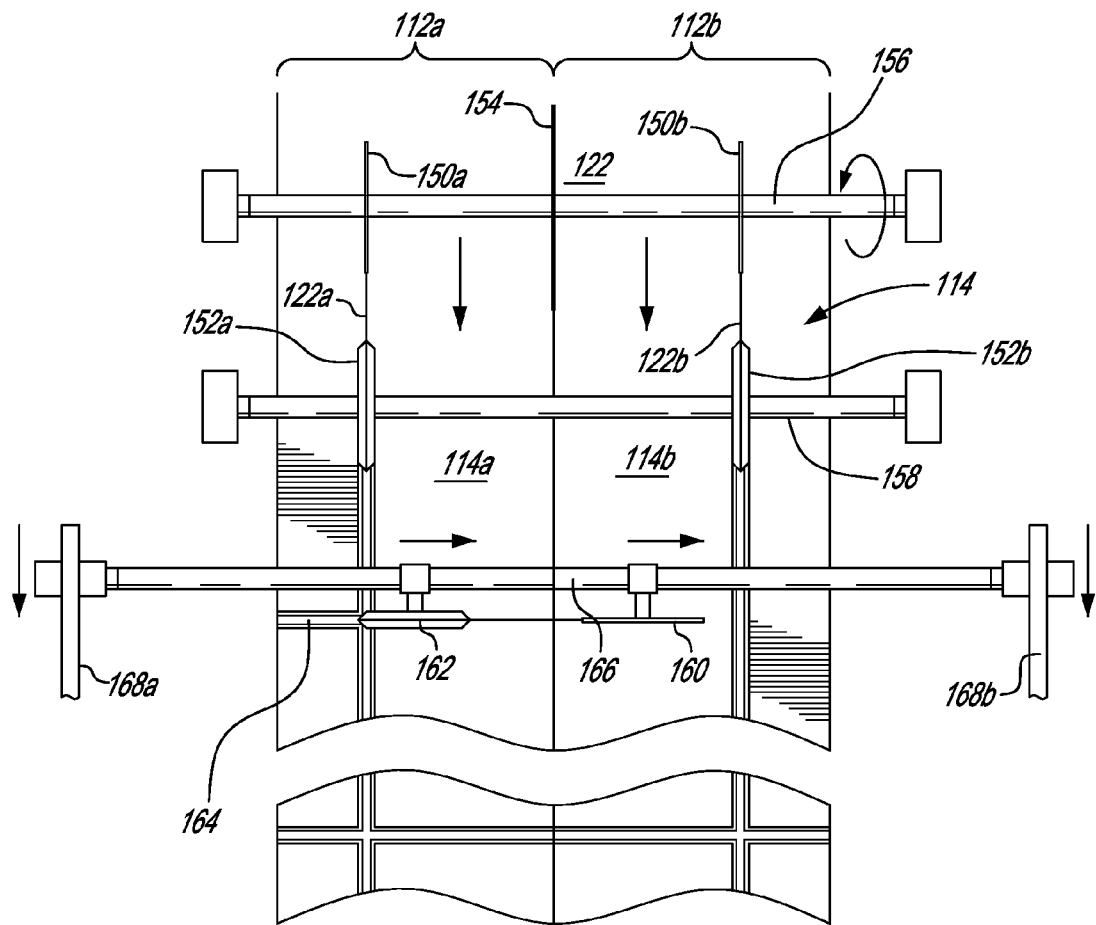
FIG. 4 is a top plan view showing a portion of the process of FIG. 3.

FIG. 4 is a top-plan view showing also showing slitting and V-groove shaping operations taking place on the longitudinally conveyed honeycomb panel 114. As shown in FIG. 4, two adjacent dunnage blanks 112*a*, 112*b* can be formed at once on a sufficiently wide honeycomb panel 114 by using a cutter blade 154 which cuts the entire honeycomb panel 114 into two halves 114*a*, 114*b*, and two slitter blades 150*a*, 150*b* cut corresponding longitudinal slits 122*a*, 122*b* into the first face 122 of the honeycomb panel 114, one on each corresponding half 114*a*, 114*b*. In the illustrated embodiment the two slitter blades 150*a*, 150*b* and the cutter blade 154 are mounted on a common rotating shaft 156, but the cutting into halves can alternately be made subsequently. More than two dunnage blanks in width can also be made in alternate embodiments as will be understood by persons skilled in the art. In this example, the longitudinal slitting by the two slitter blades 150*a*, 150*b* is followed by longitudinal V-grooving effected with two corresponding V-groove blades 152*a*, 152*b* which can both be mounted onto a common rotating shaft 158 as shown.

Further, in the example shown in FIG. 4, the longitudinal slitting and V-grooving is followed by transversal slitting and V-grooving. These latter optional steps can be used to make dunnage which has both longitudinal and tranversal V-grooves, such as the 3 panel dunnage or 5 panel dunnage referred to above. In this embodiment, the transversal slitting is effected with a transverse slitting blade 160, and a transversal V-groove blade 162 is used subsequently. These blades 160, 162 can be configured to effect a number of transversal V-grooves 164 into the honeycomb panel 114 as it is being longitudinally conveyed, and more transversal blades can also be used. A transversal cutting blade (not shown), can also be used on-line to cut and separate the honeycomb panel into a number of distinct dunnages and thereby operate in a manner similar to the longitudinal cutter blade 154 but transversally.

More precisely, in this example, a transversal slitting blade 160 slidingly mounted on a transversally extending rail 166 is used, the transversally extending rail 166 being slidingly mounted at both opposite ends against a set of longitudinal guides 168*a*, 168*b*. Henceforth, the transversal slitting blade 160 can slide along the rail 166 while being kept at a given longitudinal position relative to the honeycomb panel web 114 as the rail 166 on which it is mounted is displaced longitudinally at the same longitudinal speed than the honeycomb panel web 114. This can be realized using a system which locks onto the web or conveyor and thereafter carries the transversal rail 166 longitudinally along with it while the transversal slitting blade 160 travels across the web. The system can be spring-mounted to spring back to the original position once the slitting has been effected along the entire width. A similar principle can be used with the transversal V-groove blade 162 and the transversal cutting blade (not shown) for example. Alternately to being mounted on the same rail 166, the transversal slitting blade and the transversal V-groove blade can both be mounted on respective rails. Alternately to circular blades, non-circular blades can be used.

Figure 5:
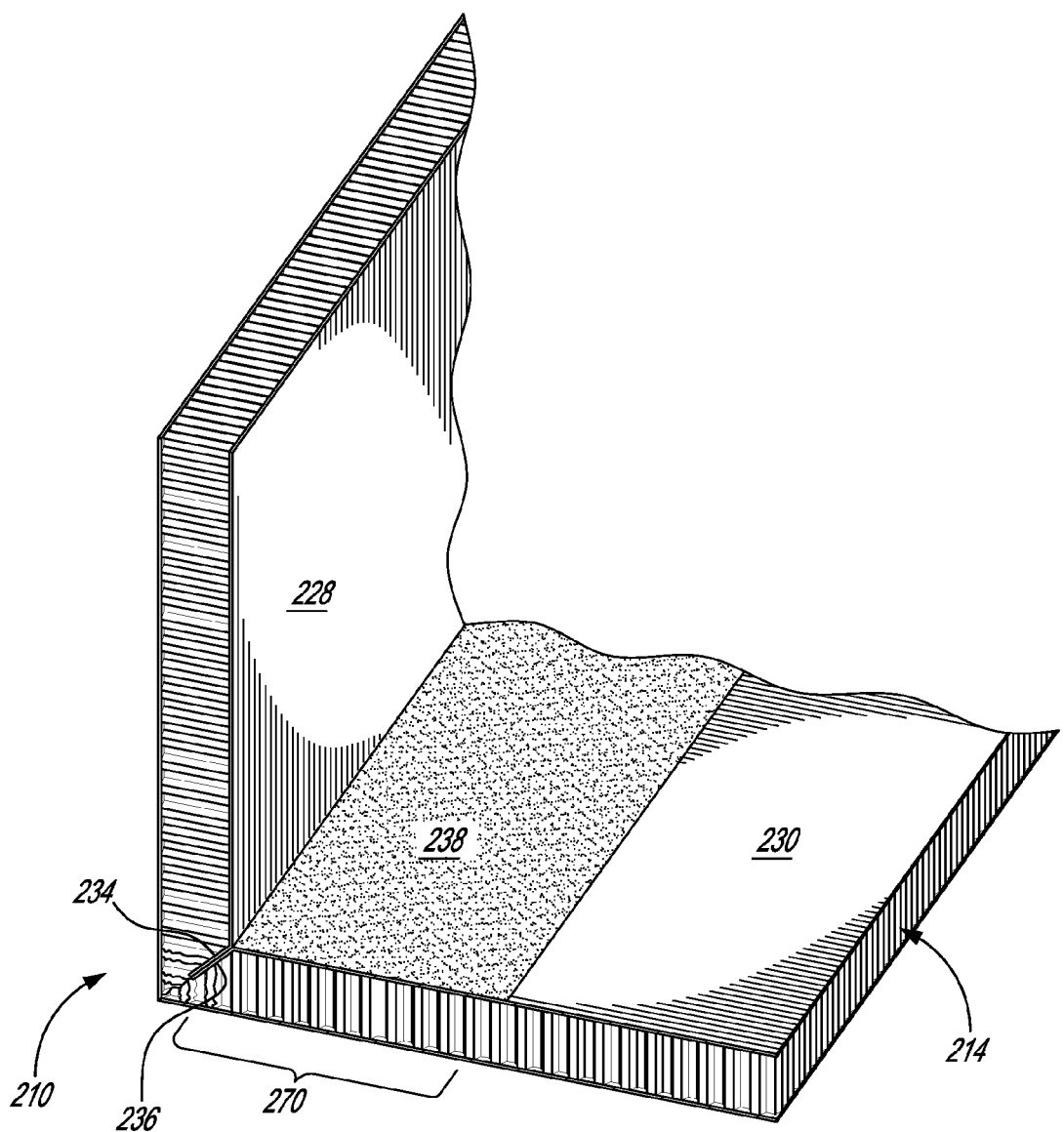
FIG. 5 is a perspective view of another embodiment of an antiskid dunnage.

FIG. 5 shows an alternate example of an antiskid dunnage 210. In this example, the cohesive coating 238 is applied only to a portion of the exposed first face of one (230) of the two panel sections 228, 230 of the honeycomb panel 214. More particularly, the cohesive 238 is only applied on the portion 234, 236 which corresponds to the V-groove, and onto a substantial portion 270 of the first panel section 230. The remainder portion of the first panel section 230, and the entire exposed face of the second panel section 228 are left bare. This can help reduce the costs because less cohesive is applied, while providing satisfactory antiskid properties for some applications, but may result in less anti-scratch properties than a dunnage 10 where the entire exposed surface of the first panel 30 and second panel 28 are covered (FIG. 2). Such a configuration of the cohesive layer 238 can be applied by using cohesive rollers on-line which do not cover the entire width of the dunnage 210, for example, or using a roller which has radially-wider and radially-narrower ("on and off") adjacent sections. In still further alternate embodiments, it can be satisfactory to apply the cohesive in a pattern with a patterned roller for example, in order to reduce the overall amount of cohesive used and consequently reduce the costs of the dunnages. Alternately to rollers, the cohesive can be applied in any suitable way, such as with spray coaters, rod coaters, or any suitable coating head to name a few examples.

The antiskid properties of the dunnage which result from the presence of the antiskid cohesive should be higher than the antiskid properties of the bare material of the face sheets. This can be the case when a latex based polyisoprene is used as the cohesive and Kraft paper is used as the base sheet, for example. More particularly, using a layer of cohesive which provides an antiskid coefficient of 1 (which corresponds to resisting sliding against the predetermined surface at an angle of 45°) can be satisfactory for many applications. A greater friction coefficient than 1 can be preferred in some applications. In an embodiment, the first surface of the first panel and/or the second panel has a friction coefficient of at least 0.5. An antiskid coefficient of 1.22 (which corresponds to resisting sliding up to 51°) has been achieved on metallic furniture. In all cases, the selected cohesive and selection of concentration thereof should result in sufficient antiskid characteristics so that the resulting panel resist sliding on a surface corresponding to the material of the article to be shipped when angled at 30°, when the face of the face sheet on which the cohesive is applied is in contact with the surface.

Figure 7:
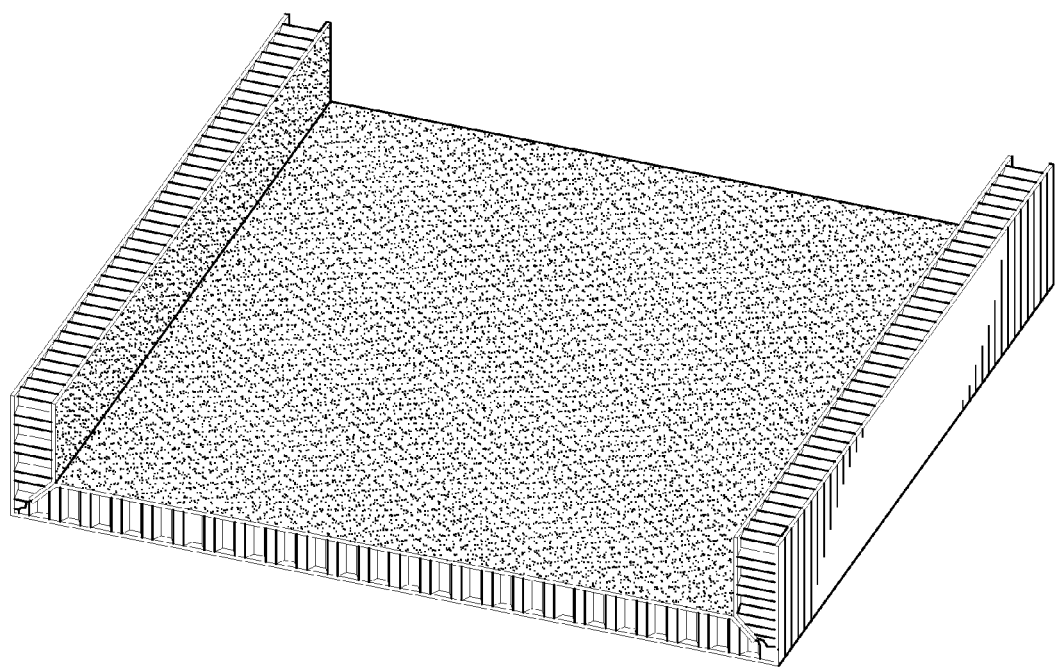
FIG. 7 is a picture showing an example of a 3-panel dunnage.

In alternate embodiments, the dunnage can have more than two panels, such as a five-panel dunnage or a three-panel dunnage shown in FIGS. 6 and 7, respectively. Further, in alternate embodiments, the dunnage can be made with a die instead of online, for example.

The embodiments described above and illustrated are provided for illustrative purposes only. The scope is indicated by the appended claims.

What is claimed is:

1. An antiskid dunnage comprising:
   a honeycomb panel having a first and second opposed faces, and a first and second adjacent panel sections folded relative to each other along a V-groove extending into the first face,
   a single antiskid cohesive material applied as a single layer on the V-groove and maintaining said first and second adjacent panel sections in said folded configuration, and also applied as a single layer on a substantial portion of one of said first and second adjacent panel sections, on the first face, said single antiskid cohesive material applied on said first face being exposed in the folded configuration to achieve a friction coefficient which is higher than without the single antiskid cohesive material.

2. The antiskid dunnage of claim 1 wherein the single antiskid cohesive material is applied as a layer on both adjacent panel sections.

3. The antiskid dunnage of claim 2 wherein the single antiskid cohesive material entirely covers the first face.

4. The antiskid dunnage of claim 3 wherein the single antiskid cohesive material is applied at less than 20 g/m².

5. The antiskid dunnage of claim 3 wherein the single antiskid cohesive material is applied at between 2 and 20 g/m².

6. The antiskid dunnage of claim 1 wherein the single antiskid cohesive material is latex-based.

7. The antiskid dunnage of claim 6 wherein the single antiskid cohesive material is polyisoprene-based.

8. The antiskid dunnage of claim 1 wherein the first surface of the one of said first and second adjacent panel sections which is covered by the single antiskid cohesive material is resistant to sliding on a predetermined work surface to at least 30°.

9. The antiskid dunnage of claim 8 wherein the predetermined work surface is a flat surface of a piece of furniture.

10. The antiskid dunnage of claim 1 wherein the first face of at least one of said first and second adjacent panel sections has a friction coefficient of at least 0.5.

11. The antiskid dunnage of claim 1 wherein the honeycomb panel has a honeycomb core sandwiched between two face sheets.

12. The antiskid dunnage of claim 11 wherein the honeycomb core and the two face sheets are made of wood-based materials.

13. The antiskid dunnage of claim 1 wherein the single antiskid cohesive material is less abrasive than the material of the first face sheet.

14. A blank for folding into an antiskid dunnage, the blank comprising:
   a honeycomb panel having a first and second opposed faces, and having a V-groove in the first face between two adjacent panel sections;
   a single antiskid cohesive including a first portion applied as a single layer on the V-groove and a second portion applied as a single layer on a substantial portion of at least one of the two adjacent panels, on the first face thereof;
   wherein the blank can be folded along the V-groove into a dunnage configuration, and thence be automatically maintained in the dunnage configuration by activation of the first portion of antiskid cohesive, wherein the second portion of the single antiskid cohesive is exposed to a work surface and provides antiskid thereagainst which is higher than without the single antiskid cohesive.

* * * * *

UNITED STATES PATENT AND TRADEMARK OFFICE
CERTIFICATE OF CORRECTION

PATENT NO. : 8,623,489 B2  
APPLICATION NO. : 12/551197  
DATED : January 7, 2014  
INVENTOR(S) : Diego Depaoli et al.

Page 1 of 1

It is certified that error appears in the above-identified patent and that said Letters Patent is hereby corrected as shown below:

Title Page

Item [73], the Assignee:

"CASCADES CANADA INC" should read

-- CASCADES CANADA ULC --.

Signed and Sealed this  
Sixteenth Day of September, 2014

Michelle K. Lee  
*Deputy Director of the United States Patent and Trademark Office*